(12) United States Patent
Chen et al.

(10) Patent No.: US 7,664,561 B1
(45) Date of Patent: Feb. 16, 2010

(54) TASK QUEUING METHODOLOGY FOR REDUCING TRAFFIC JAM AND TO CONTROL TRANSMISSION PRIORITY IN AN AUTOMATIC MATERIAL HANDLING SYSTEM

(75) Inventors: Hung-Yi Chen, Changhua (TW); Ming-Hsung Chung, Taoyuan (TW); Wen-Cheng Chin, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1718 days.

(21) Appl. No.: 10/132,333

(22) Filed: Apr. 25, 2002

(51) Int. Cl.
*G06F 19/00* (2006.01)
(52) U.S. Cl. ...................... 700/101; 700/112
(58) Field of Classification Search ................ 700/121, 700/112, 113, 95, 218, 228, 229, 230, 99–102
See application file for complete search history.

(56) References Cited

U.S. PATENT DOCUMENTS

| | | | | |
|---|---|---|---|---|
| 5,455,894 | A * | 10/1995 | Conboy et al. | 700/247 |
| 5,612,886 | A * | 3/1997 | Weng | 700/101 |
| 5,838,566 | A * | 11/1998 | Conboy et al. | 700/115 |
| 5,924,833 | A * | 7/1999 | Conboy et al. | 414/217 |
| 6,035,245 | A | 3/2000 | Conboy et al. | 700/214 |
| 6,108,585 | A | 8/2000 | Ryan et al. | 700/112 |
| 6,134,482 | A * | 10/2000 | Iwasaki | 700/121 |
| 6,157,866 | A * | 12/2000 | Conboy et al. | 700/121 |
| 6,308,107 | B1 * | 10/2001 | Conboy et al. | 700/121 |
| 6,431,814 | B1 * | 8/2002 | Christensen et al. | 702/81 |
| 6,449,520 | B1 | 9/2002 | Lin et al. | |
| 6,580,967 | B2 * | 6/2003 | Jevtic et al. | 700/228 |
| 6,662,076 | B1 * | 12/2003 | Conboy et al. | 700/214 |
| 6,684,121 | B1 | 1/2004 | Lu et al. | |
| 6,687,563 | B1 | 2/2004 | Wang et al. | |
| 6,778,879 | B2 | 8/2004 | Chang et al. | |
| 7,024,275 | B2 | 4/2006 | Lai | |
| 2006/0070014 | A1 | 3/2006 | Liu et al. | |
| 2008/0015723 | A1 | 1/2008 | Chen et al. | |

OTHER PUBLICATIONS

Gino Crispieri, "Automation Overview", PowerPoint presentation, International Sematech Manufacturing Iniative, 15 pages.

(Continued)

*Primary Examiner*—Ryan A Jarrett
(74) *Attorney, Agent, or Firm*—Haynes and Boone, LLP

(57) ABSTRACT

A new Task Queue Methodology (TQM) is provided for reducing traffic jams and for controlling transportation priority in an Automatic Material Handling System (AMHS). A Stocker Resource Q, under control of TQM, maintains records of stockers that are under control of the AMHS and the availability thereof. For available stockers, a Task-Q under control of a Queue Manager (TQM) is accessed, extracting therefrom records that match available stocker resources. For the available stocker resources, the tasks that are scheduled against these resources are sorted by priority and by longest wait time, resulting in one selected task. For the in this manner selected task, a Move command is issued by the TQM to the Automatic Material Handling System.

13 Claims, 3 Drawing Sheets

OTHER PUBLICATIONS

Len Foster, "300mm Wafer Factory Automation and the Logistics Infrastructure Challenge", Montgomery Research, Future Fab Intl., vol. 11, Texas Instruments Incorporated, Jun. 29, 2001, 11 pages.

M. Austen et al., "Automated Process Job Execution wition on 300 mm CIM Environment", Montgomery Research, Future Fab Intl., vol. 8, Jul. 1, 2000, 19 pages.

Ken Van Antwerp, "Automation in a Semiconductor Fab", Semiconductor International, Dec. 1, 2004, 6 pages.

"300 mm Equipment Base Software Functionality Requirements . . . ", International SEMATECH, 96 pages, Dec. 21, 2001.

"AMHS Equipment", Dec. 1, 1998, 4th Selete 300mm PEPA, 1 page.

* cited by examiner

TASK QUEUING METHODOLOGY FOR REDUCING TRAFFIC JAM AND TO CONTROL TRANSMISSION PRIORITY IN AN AUTOMATIC MATERIAL HANDLING SYSTEM

BACKGROUND OF THE INVENTION (1) Field of the Invention

The invention relates to the fabrication of integrated circuit devices, and more particularly, to a method of task queuing in order to reduce traffic jams and for controlling the priority in an Automatic Material Handling System (AMHS).

(2) Description of the Prior Art

For the fabrication of semiconductor devices, wafers form a basic component of such a fabrication process. In order to effectively manage a relatively large semiconductor foundry, such an operation is typically divided in separate functional or operational units or bays. Each bay is specifically designed and used for a particular operation that is provided within the functional scope and equipment capabilities of the bay. Since wafers form a basic component for the process of creating semiconductor devices, it stands to reason that wafers must be transported to the location where wafer undergo particular processing steps. The transport of wafers within or between bays is typically an automated operation, where the method of transport is arranged along lines of placing multiple wafer in wafer cassettes or wafer boats and this multiplicity of wafers is transported as a unit. The number of wafers contained in one wafer cassette may be about twenty-five wafers. Before the wafers are loaded into the wafer cassette, the storage of raw wafers is typically provided by a relatively large semi-automated cabinet, where entry and exit of the wafer into and from the cabinet is machine or operator controlled or by a combination thereof. Wafers that are placed inside the wafer cabinet are preferably first placed into the wafer cassettes, this in order to avoid unnecessary handling of the wafers at the time that the wafers are removed from the wafer cabinet.

Wafer cabinets are provided with entry and exit ports, through which the wafer cassettes with the therein-placed wafers proceed. It is further not unusual for empty wafer cassettes to be placed inside the wafer cabinet, from which these empty cassettes are retrieved on operator request.

All of these operations are a subset of moving product, of which wafers form a significant part, through a semiconductor foundry. Computers have long since found application and implementation in managing the logistics and traffic flow that underlies this flow of product. Computers and their ability to almost instantly react to either manually of automatically submitted requests for an operation or to automatically detect conditions in a processing environment are ideally suited for this type of application. In addition, computers are ideally suited for interfacing floor or logistics control systems with a host of other and related systems that equally apply to the ordering and finally shipping of semiconductor devices. In view of the numerous steps that must be performed before an ordered product can be delivered to a customer, steps of creating the product which implies moving the product through the foundry, of testing, of quality assurance, of cost analysis and of numerous other steps, and further in view of the fact that most of these steps are closely related, computers and the therewith associated and supporting computer software is ideally suited for this kind of application.

Since cost is an underlying motivator in any of the applications that relate to creating semiconductor devices, considerations of cost also weigh heavily as they relate to aspects of logistics or moving product through the semiconductor foundry. It stands to reason that such a process of logistics must be cost-effective, which further implies that the product must be moved without incurring delays and that priority assignment and modification thereof must be part of a logistics control system. Any deviation from this optimum product flow, such as an irregular flow of product ("traffic jam") or moving product in an incorrect priority, can be expected to add cost to the process of logistics of the foundry, which will ultimately reflect in the cost of the product itself. The invention addresses these concerns and provides for a method of reducing traffic jams in the flow of product and for issues of priority assignment.

U.S. Pat. No. 6,308,107 to Conboy et al. discloses a real-time decision making system for the reduction of time delays in an AMHS. The system compares historical routing times with actual routing times to select alternative routings for material.

U.S. Pat. No. 6,108,585 to Ryan et al. describes a method for dispatching wafers in an AMHS. Probability distribution is used in the dispatch algorithm.

U.S. Pat. No. 6,035,245 to Conboy et al teaches an AMHS. A data process system is used to maintain historical records of material movement intervals. These records are used in an algorithm to achieve minimum movement times.

SUMMARY OF THE INVENTION

A principle objective of the invention is to reduce traffic jams in transporting wafer lots.

Another objective of the invention is to control transportation priority in an Automatic Material Handling System (AMHS).

In accordance with the objectives of the invention a new Task Queue Methodology (TQM) is provided for reducing traffic jams and for controlling transportation priority in an Automatic Material Handling System (AMHS). A Stocker Resource Q, under control of TQM, maintains records of stockers that are under control of the AMHS and the availability thereof. For available stockers, a Task-Q under control of a Queue Manager (TQM) is accessed, extracting therefrom records that match available stocker resources. For the available stocker resources, the tasks that are scheduled against these resources are sorted by priority and by longest wait time, resulting in one selected task. For the in this manner selected task, a Move command is issued by the TQM to the Automatic Material Handling System.

DESCRIPTION OF THE PREFERRED EMBODIMENTS

An Automatic Material Handling System (AMHS) is a transportation control system for an Integrate Circuit (IC) foundry, which provides services for automatic wafer transmission and storage. Operators can retrieve wafer quantities, defined as wafer lots, which previously have been stored in stockers from the AMHS for further processing. The AMHS system transfers the wafer lots to a location that is specified by an operator.

Due to the wafer processing characteristics in a furnace processing area, many wafer lots will be simultaneously processed using the same processing parameters or recipe and have a commonality of test results that are related to the wafers belonging to a wafer lot. After wafer processing, most of the processed lots are forwarded to the same destination, that is the location of the photoresist processing area. Operators in the furnace processing area enter wafer lots into the AMHS, these entered wafer lots will be automatically forwarded to the photoresist processing area. Operators may also retrieve or assign multiple lots to the same stockers for a relatively short period of time. Because the AMHS does not support load balancing between stockers, the lot retrieving command will be executed as soon as a vehicle for transporting the wafer lot is available. This is the reason that a "traffic jam" frequently occurs in the furnace diffusion area and in the photoresist processing area.

In addition, AMHS also does not support priority-based transportation. High-priority and low-priority wafer lots will be treated as having the same transportation priority. Some high priority lots may therefore wait for a long time before the high priority lot is processed since a number of low priority lots are in a wait state and ahead of the high-priority lot in the AMES. Some wafer lots may therefore not be delivered on time.

The invention provides a task queuing mechanism to reduce the probability of the occurrence of a traffic jam and to improve Operation Service Time (OST) in the AMHS. This mechanism also supports priority based lot transportation, in which urgent or high-priority lots will be transported before non-urgent or low priority lots are transported. Because the vehicle destination location is under control of the AMHS and will be not jammed at a location, the vehicle utilization and delivery time will also be improved. The overall AMHS performance is significantly improved using the approach that is provided by the invention.

Figure 1:
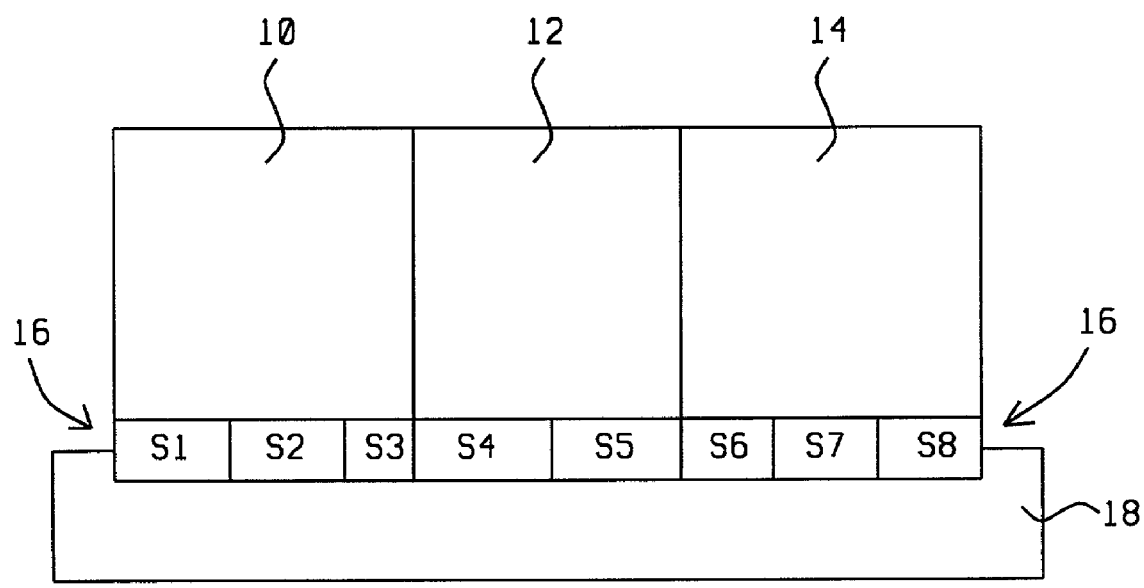
FIG. 1 shows a summary overview of the tools that are part of the process of wafer transportation.

For a better understanding of the process of transporting (also referred as transmitting) wafers, a brief overview will be given of the tools that are part of this process of wafer transportation, FIG. 1 is used for this purpose. The overview that is shown in FIG. 1 is a representative example of an arbitrary sub-set of processing tools that are typically part of a semiconductor manufacturing facility. The examples that are highlighted in FIG. 1 are as follows:

10, one or more diffusion surfaces

12, one or more CVD chambers

14, one or more photoresist processing stations

16, (a total of eight) stockers, highlighted as stockers S1 through S8, which are the mechanical means of providing wafers to the three sectors 10, 12 and 14

18, a mechanical track that moves the stockers S1 through S8 to positions for availability to the three sectors 10, 12 and 14.

Using conventional methods of scheduling product (wafer lot) movement, the operator enters the relevant data such as stocker ID, from and to (stocker location (ID), in addition to applicable comments, via a computer terminal, which results in the computer directly issuing a move command to the AMHS. Using the method of the invention, the operator command, comprising the required information, is forwarded to the TQM server, which, after the processing that is described herein as the invention, issues a transmission command to the AMHS. The TQM server of the invention analyzes lot priority and stocker resources and based on the results of this analysis issues a transmission command for a selected stocker to AMHS.

The problems encountered by the conventional method of transmitting (moving) wafer lots can be summarized as follows:

1. batch processed lots in a furnace area, typically for instance six lots with 25 wafers forming a lot, can have the same destination stocker, causing a traffic jam in transmitting wafers
2. operators may retrieve multiple lots from the same stocker within a very short time period, causing delays in retrieving lots
3. due to the nature of the operations, the conventional method frequently results in serious traffic jams in the photoresist and the diffusion areas
4. high-priority lots are not delivered on time since AHMS does not support priority scheduling of the stockers
5. AMHS does not support load-balancing between stockers, which for instance can hold between 100 and 200 lots
6. Operator Service Time (OST) and the Delivery Time (DT) continue to increase, and
7. the AMHS performance among which are response time and stocker (vehicle) utilization are becoming increasingly constrained.

In view of the above highlighted problems and bottle necks, the invention teaches:

a queuing methodology to leverage the peak material transportation tasks, thereby reducing conditions of traffic jam a method to implement transportation priority such that higher priority lots are transferred first, and the definition of a configurable and independent Q-length for each stocker.

The principles that are used by the invention are summarized as follows:

the stocker definition is loaded from an external database both the event of a user storing a lot into a stocker (or push) and a user retrieving a lot from a stocker (or pull) are recorded in a task Queue, the record format of the task Queue records is highlighted following the task Queue is periodically checked, a move command is issued in accordance with available stocker resources and lot priority, and a task Queue tracks a lot moving event and updates the task status in the task Queue, and a stocker resource file, containing stocker resource Queue records, tracks stocker resources.

A stocker is conventionally identified by a stocker ID while a stocker is further defined by the number of maximum tasks (MaxTaskNo) that a stocker can handle and the number of tasks that are currently being handled by the stocker (CurTaskNo). The maximum task number of a stocker reflects the total number of Input/Output ports of a stocker, for instance a stocker may have two input ports and two output ports resulting in a maximum number of tasks that the stocker can handle of four. The current task number indicates the number of the stocker I/O ports that are at a given time being used and are therefore not available for assignment at that time. For instance, a stocker with a maximum task number of four and a current task number of one, has three I/O port available for assignment at that time. Typically, the MaxTaskNo is equal to two times the number of output ports of a stocker.

Under the invention, product that is transmitted in accordance with the simplified tool and bay arrangement of FIG. 1, which is however an accurate representation of a complete tool complement and the therewith associated movement of wafers to the tools of a semiconductor manufacturing facility, is tracked by task-Q records that are maintained by the TQM is a task-Q file.

The method of the invention is based on a Task Queuing Methodology (TQM) in which the TQM server or software package (which is running as a stocker scheduler in a Control Information Manager (CIM) system) will record all the moving (or running) and waiting tasks in the task queue (task-Q) to leverage the peak of material moving tasks. A moving (or transporting or transmitting) task is thereby defined as a step or procedure to move a wafer stocker from one location to another location, as has been highlighted in principle in FIG. 1.

The information that is recorded in the Task Queue will be recognized as the previously highlighted LotID and its related data, comprising:
 a lot ID (LotID)
 the stocker ID or location where the lot is presently positioned (CurPos)
 the stocker ID or location to which the lot is scheduled to be transmitted (DestPos))
 the move priority that is assigned to the transmission (or movement or transport) of the lot, which is a numerical value, and
 the status of the lot, which is differentiated between Run (the lot is being moved) and Wait (the lot is ready to be moved and is waiting to be moved).

The TQM server also maintains a matrix of available stocker resources. For each stocker, identified by Stocker ID, a maximum loading task capability applies (MaxTaskNo), based on the total Input/Output (I/O) ports of the stockers. For each stocker the number of tasks that are presently assigned to that stocker (the number of I/O ports occupied for wafer lot transportation) is tracked (CurTaskNo). The records, referred to as stocker resource Q records, that are therefore maintained by the TQM server in the stocker resource table have the following format:
 StockerID
 MaxTaskNo, and
 CurTaskNo.

At the time that a lot is being placed into a stocker or when an operator is retrieving a lot from the stocker, the TQM server creates a new task in the task queue, in accordance with the previously highlighted format of the records of the Task Q.

A periodical timer function checks all the tasks existing in the task queue and creates a move command to AMHS, based on conditions that are discussed below.

1. If the number of current tasks (CurTaskNo) of the destination stocker is less than a maximum number of tasks (MaxTaskNo), then a move command will be issued for the task with the highest Move Priority (as indicated in the task Q) and the current task number (CurTaskNo) of the specified destination stocker will be increased by one.
2. If the destination stocker is not available (CurTaskNo is equal to MaxTaskNo in the stocker resource Q), then the move command will not be issued.
3. The TQM server function keeps track of the lot position change in AMHS and reduces the task number of the stocker (CurTaskNo) by one after a lot has been transported to a target stocker (the task of transporting is completed, therefore the number of current tasks for that locker must be reduced by one).
4. The TQM server will also store the transmission time and the transmission path in database of the TQM.

The user of the AMHS system can configure the maximum number of tasks (MaxTaskNo) for each stocker by reference to the numbers of I/O ports and to the performance of the stocker. In most cases, the maximum task number is 2 times the output port number of the stocker.

Because the number of material transmission requests to the AMHS is being controlled, the probability of the occurrence of a traffic jam is reduced. Further, because TQM always first selects the lot with the highest Move Priority from the task queue, urgent lots (which are lots that have higher priority and are needed soon) are served prior to non-urgent Lots.

The equations that are used by the invention for the calculation of the Move Priority are as follows, these equations and their parameters will be explained following the summary of these equations:

Move Priority=Material Priority+Material Delivery Priority wherein:
1. Material Priority=(Priority Base−Lot Priority)×Priority Weight
2. Material Delivery Priority=(Delivery Base−Transmission Ratio)×(Transfer Weight), and
3. Transmission Ratio=(Predict Request Time−Current Time)/(Transmission Time+Waiting Time).

The above highlighted equations define the material Move Priority for the TQM Server. The Move Priority is defined based on Lot Priority and Material Delivery Priority of the AMHS.

The "Priority Base" is a constant value for adjusting Material Priority. This constant value can be set by manual input to any constant value larger than the largest Lot Priority.

The "Lot Priority" is the rank of lot processing speed defined in the Manufacturing Executive System, the Lot with the lowest priority value must be processed first. For example, a lot with priority 1 must be processed before processing a priority 2 lot.

The "Priority Weight" and the "Transfer Weight" are configurable by site users in order to meet their customization requirements, the values for these parameters are therefore also provided to the system by manual input. In most cases, the "Transfer Weight" will be set to a value larger than the "Priority Weight", to ensure that the material delivery priority is more important than the lot priority.

The "Delivery Base" is a constant value for Material Delivery Priority. This constant value can be set (by manual input) to any constant value larger than the largest Transmission Ratio.

The Material Delivery Priority is calculated from a Transmission Ratio. This Transmission Ratio is the "Remaining Time" divided by the "Material Delivery Time", where the Remaining Time is the "Predict Request Time" minus "Current Time" and the Material Delivery Time is the "Transmission Time" plus the "Waiting Time".

The "Predict Request Time" is generated by the Fabrication (FAB) scheduling system at the time that the lot is placed into the stocker. This is the time when the lot is (expected to be) processed by the processing equipment.

The "Current Time" is the time of the invocation and execution of the TQM and is typically provided by and synchronized with an AMHS time setting.

The "Transmission Time" is the average transmission time from a current position to a destination position for a particular stocker.

The "Waiting Time" is the average waiting time for a lot of a priority and assigned to a particular stocker before the TQM server issues a MOVE command to the AMHS.

From a statistical point of view, lots with higher priority will have lower waiting time. These two values of "Transmission Time" and "Waiting Time" are calculated from lot move history data, which have been saved in the TQM database by the TQM server at the time when lots are transferred under control of the AMHS system.

Finally, the TQM server daily re-calculates the average "Transmission Time" and the "Waiting Time" of each stocker and each Lot priority, based on moving history data in the TQM database.

The basic functioning of the TQM of the invention is therefore as follows:

A timer function activates the function, the timer function can be invoked at a set interval or at any other arrangement of creating successive interrupts by the timer interval After activation of the TQM, the TQM accesses a stocker resource Q which indicates resource status; for each stocker ID in the stocker resource Q, accessed in sequence, a first record will be selected that indicates the therewith associated stocker ID is available, that is CurTaskNo is less than MaxTaskNo For the thus selected stocker ID, the Task-Q is accessed by matching the stocker ID with a current position (stocker ID); from the current position ID the Task-Q record reveals which lot is scheduled for this stocker ID, where this lot is supposed to go to (destination position) and the priority that is currently valid for this transmission of this lot Having at this time singled out a stocker with available resources and a lot that is scheduled to be moved from-to by this stocker, it remains to be determined which move has the highest priority When the task number of the destination stocker is less than the maximum task numbers, then the TQM server selects from the Task-Q the lot having:

1. the largest Move Priority 2. the longest waiting time in the task queue, and 3. issue the MOVE command to the AMHS.

Because the Move Priority is calculated from the lot priority and from the material delivery priority, the TQM transfers Lots with the highest Move Priority first. This assures that urgent or high priority lots will have a higher transportation priority than non-urgent or low priority Lots.

It is of value to summarize the above parameters. This summary is of importance since, because some of these parameters must be calculated, the input parameters for such calculation must be provided. The summary is as follows:

Constants, thereby including constants that are provided as adjustment parameters provided by system users and the like, are:

1. Priority Base

2. Lot Priority

3. Priority Weight

4. Transfer Weight, and

5. Delivery Base

Parameters, calculated by TQM or provided by supporting system functions are:

1. Transmission Ratio, calculated by TQM

2. Predict Request Time, maintained by a Fabrication (FAB) scheduling system function 3. Current Time, readily available from supporting software functions or internally maintained by TQM 4. Material Delivery Time, calculated by AMHS, being equal to Transmission Time (see below) plus Waiting Time (see below)

5. Transmission Time, calculated by AMHS, being equal to the average time expired between moving a stocker from current position to destination position, both time of departure and time of arrival being maintained and provided by AMHS, and 6. Waiting Time, calculated by AMHS, being equal to the average time expired between the AMHS issuing a Move command for a lot and that lot being assigned to (by lot ID/current position stocker ID in the Task Q) to that stocker ID, both time of issuance of Move command and time of assignment to a stocker ID being maintained and provided by AMHS.

Figure 2:
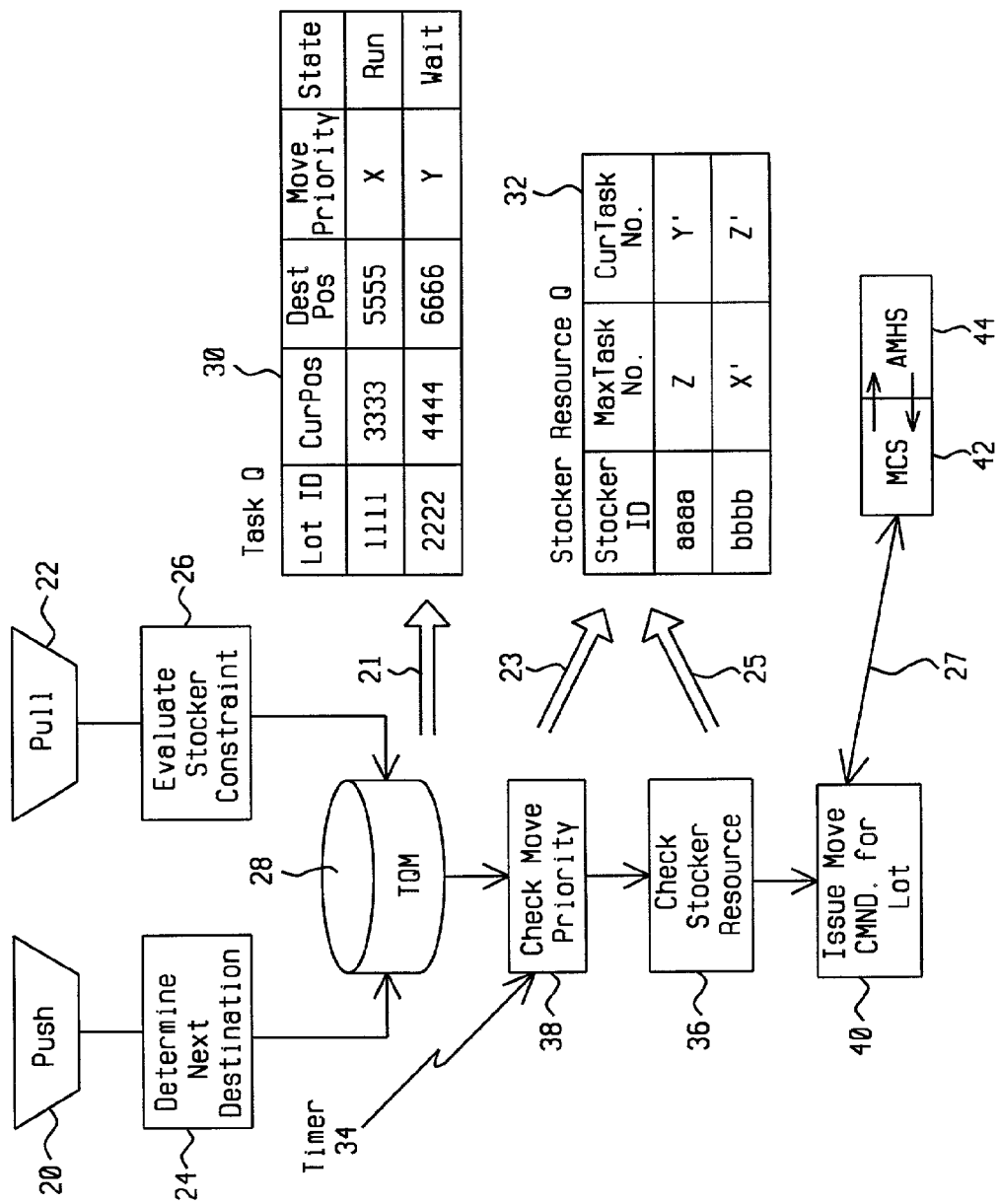
FIG. 2 shows a System Flow diagram of the methodology of the invention.

Using FIG. 2, the operation of the invention is now summarized.

Function 20, FIG. 2, represents the storing of a lot into a stocker, function 22 represents retrieving a lot from a stocker. Both events of storing and retrieving are under control of the AMHS and are recorded in a task Queue by either creating a new record (if the lot is new) or updating an existing record (if the lot has previously been entered). These two functions therefore represent entering (push, function 20) a new lot into the system or removing (pull, function 22) a lot from the system.

In either case, the Task Q (30) is updated by the TQM function 28 with the push operation 20 potentially resulting in the creation of a new record or in updating an existing record in the Task Q 30 for that lot (entering LotID), the entering of the CurPos (that is the stocker ID of the stocker into which the lot is located), of entering the DesPos (that is the stocker ID of the stocker to which the lot must be moved, function 24, whereby the DesPos is most typically provided to the AMHS by the operator who enters the new lot into the system), the TQM function 28 extracts a Move Priority (in accordance with the Move Priority equations that have been highlighted above), and indicates the State of this (new) task. For lots that are just entered into the system, it might be expected that at this time the State of the lot is a Wait state. However, function 26 evaluates if the stocker that is designated as the DestPos has any constraints in moving the lot at this time to this DestPos. A constraint exists if the current tasks that are assigned to the stocker is equal to the maximum number of tasks that the stocker can handle (table 32, MaxTaskNo CurTaskNo).

If a pull (22) operation is required, as indicated by the AMHS, the TQM will evaluate, using function 26, whether any constraints apply for the retrieval of the lot. That is the case for instance, in addition to the above highlighted constraint, if the stocker for which the retrieve operation is initiated is at this time in the Run state, then the retrieve operation must be delayed to the point where the Run state is lifted at which time the lot can be retrieved. This evaluation requires that function 26, for a given LotID (in the Task Q 30) find the State condition of this lot, which will indicate that either a Run (implying a delay in retrieval of the lot) or a Wait condition applies (the lot can be retrieved at this time).

For lots that have completed being routed through the system, an operation similar to the Pull operation is initiated by AMHS and recorded by the TQM since these lots are no longer required to be part of the processing of the system. For a DestPos that is therefore designated as being the last DestPos for that lot, the TQM function removes (purges), based on instructions of the AHMS, the record for this LotId from the Task Q. The (now empty) record in the Task Q can at a later time be re-used for a new lot that is entered into the system, the TQM therefore also keeps track of record allocation.

The Check move Priority function of the TQM<has been highlighted with 38 in the flow diagram of FIG. 2, the Check Stocker Priority function with 36, the Timer function with 34, the function that issues with MCS/AMHS to issue a Move command with 40, the Task-Q with 30, the Stocker Resource Q with 32, the TQM database with 28, the interface between the TQM and the Task-Q with 21, the interface between function 38 and the Stocker Resource Q with 23, the interface between function 36 and the Stocker Resource Q with 23, the interface between function 40 and the MCS/AMHS with 27, the MCS with 42 and the AMHS with 44.

Additional functions that are performed by the TQM or the AMHS and that are, for reasons of presentational simplicity, not highlighted in the flow diagram of FIG. 2 are the following:

1. The AMHS records the time-of-day at the time the Move command is issued, at which time the Run state for a given lot is initiated. This time is (automatically) provided to the TQM function by the supervisory AMHS
2. The AMHS records the transmission path that is taken by a lot, this data is maintained in the TQM by recording successive CurPos and DestPos data
3. The AMHS records the time of arrival of a given lot at a DestPos. This time is (automatically) provided to the TQM function by the supervisory AMHS
4. The AMHS calculates the transmission time by subtracting the above time-of-day at the time the Move command is issued from the time of arrival; the AMHS is thereby not limited to performing this calculations for transmissions that are completed within for instance a 24-hour time span but can further accommodate transmissions that may be completed later than for instance 12 and 24 hours after the Move command has been issued. This implies that the AMHS is not only sensitive to time-of-day but in addition is sensitive to the date for which time-of-day data is entered and maintained
5. AMHS calculates the wait time of a lot, which is the time that expires between the lot being placed in the Wait state and the time that the lot is placed in the Run state by issuing the Move command.

From the above it can be concluded that table 30, the Task Q, represents the totality of the tasks that are being performed in moving wafers, as reflected in the Run or Wait state that applies to each of the wafer lots that are under control of the system.

What must be balanced against the tasks that are scheduled by the system must be the means (or stockers) that are available to perform these tasks. This evaluation must be performed in time-independence of the TQM function for which reason Timer Pulse 34 is supplied, as a time-interrupt, by for instance the Manufacturing Control system (MCS) function as part of the AMHS. This timed interrupt, at the time of interrupt, initiates, function 36, the availability of the stocker resources which is reflected and recorded in the Stocker resource Q 32.

Figure 3:
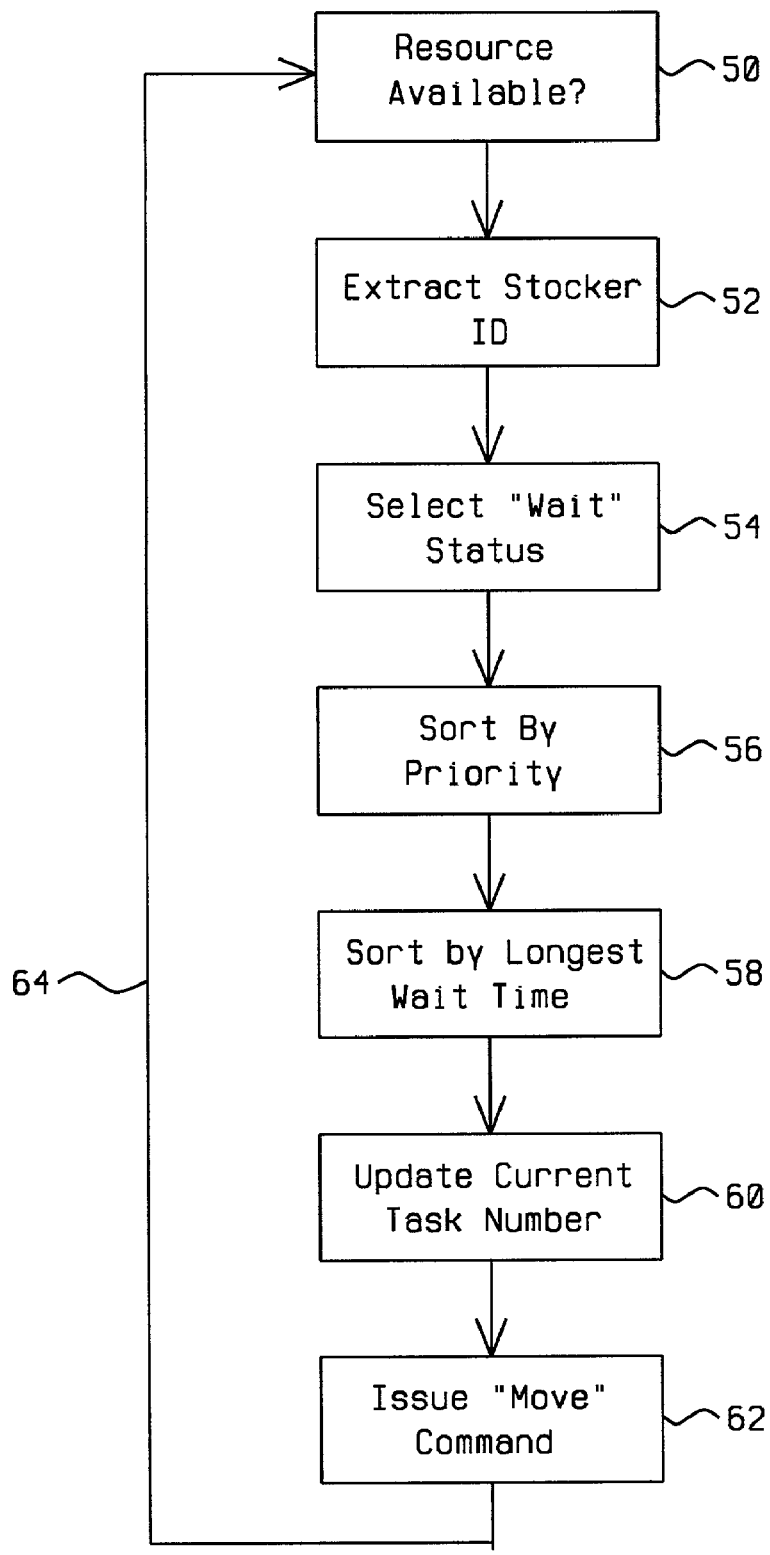
FIG. 3 shows a flowchart of functional operation of the methodology of the invention.

To further highlight the functional flow of the process of the invention, the flow chart that is shown in FIG. 3 is used.

At the time that the timed-interrupt 34 is provided, the TQM:

Determines, as a first step 50, resource availability by accessing the storage Resource Q in sequential manner, accessing one record at a time. Resource availability evaluation is stopped at the time when a first stocker resource record is found having a CurTaskNo that is less than a M<axTakNo; this record identifies a stocker that can "handle more work", the stocker that is identified as such will be referred to as the Available Stocker ID (ASID)

Access, step 52, the Task-Q, find in the CurPos column all stocker ID numbers that match the ASID; this is a first step in determining if more work can be scheduled for this ASID; sequentially list all Task-Q records for which a match between CurPos and ASID is found, creating a first file Remove, step 54, from the first file all record that indicate a Run state, removing from the available stockers all stockers that are moving a lot Sort, step 56, the first list in order of Move Priority Sort, step 58, the first list in descending order of Wait time, resulting in placing the Task-Q record for a stocker ID with the highest priority and the longest wait time as the first record in the first list Update, step 60, the CurTaskNo for this stocker ID in the Stocker Resource Q Instruct, step 62, AMHS to issue a Move command for this stocker ID Instruct AMHS (not shown) to re-calculate Move Priority based on a new value for "Waiting Time" for the lot assigned to the ASID Resume, step 64, processing starting from the above highlighted first It is of value to briefly review the invention in a simplified form, as follows:

the invention tracks scheduled tasks the invention tracks entering and extracting tasks from the system the tasks that are tracked by the system are prioritized by AMHS hardware resources that are under control of the AMHS system and that are required to perform the scheduled tasks are tracked for workload scheduled against these hardware resources a time signal, provided by a source not under control of the system, initiates, for a task of a given and preferably high priority, an evaluation of availability of the hardware resources as a function of the priority and waiting time of the tasks scheduled for these hardware resources the AMHS system assigns tasks (issues a move command) for available hardware resources and dependent on the priority of existing tasks assigned to these hardware resources.

The invention has provided for, based on experimental results and measurements, reducing the wait time and the transmission time for retrieving lots, which has resulted in:

1. improving OST performance by 33%
2. improving DTA performance by 20%

Reducing traffic jam probability since the vehicles no longer jam at specific stockers when the user is retrieving multiple lots Lot delivery is linked with priority control, high priority lots are served first.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method for assuring constant product movement and for controlling priority of movement of product in an Automatic Material Handling System ("AMHS"), said method comprising:

periodically checking task related records, wherein a task is a movement of a product from a current position to a destination position, and further wherein each task related record includes:
- a lot identification number;
- a current position identification number, being a stocker identification number;
- a destination position identification number, being a stocker identification number;
- move priority, being a numerical indicator;
- move status, being a run status and a wait status;
- transmission time, being a time expired between issuing of a move command and arrival at the destination position; and
- waiting time, being a time expired between entering a wait status and entering a run status;
- path traveled, being a running record of current position identification number and destination position identification number, each of these running records being provided with a time stamp;

creating, maintaining, updating, and deleting of the task related records;

creating, maintaining, updating, and deleting of stocker related records, whereby a stocker is a basic unit for containing and transporting said product;

evaluating, by a computer, stocker resources, thereby using the stocker related records to identify an available stocker, said available stocker identified with an available stocker ID (ASID);

evaluating, by the computer, move priority, thereby accessing the task related records using said ASID as a search argument, thereby selecting the task related record with a Highest Move Priority record having a longest wait time; and directing, by the computer, said AMHS to issue a move command for the task related record with said Highest Move Priority record having the longest wait time.

2. The method of claim 1, wherein said creating, maintaining, updating, and deleting of task related records comprises storing said task related records in a Task-Q file, each task related record in said Task-Q file being represented by a Task-Q record.

3. The method of claim 2, wherein said creating, maintaining, updating, and deleting of task related records in the Task-Q file comprises, on a per task basis:
- entering the task into the Task-Q file, including entering a current position and a destination position, concurrently entering a time indicator of said entry of said task into said Task-Q file;
- deleting the task from the Task-Q file, concurrently entering a time indicator of said deleting of said task from said Task-Q file;
- calculating a first time expired between said entering of the task into said Task-Q file and deleting the task from said Task-Q file;
- recording and updating the task's run status and wait status, concurrently entering a time indicator of initiation or termination of said task's run status and wait status;
- recording a time indicator of task completion;
- calculating a second time expired between said task completion and said initiation of said run status, said second time expired being a transmission time;
- calculating a third time expired between said initiation of said run status and initiation of said wait status, said third time expired being a waiting time; and
- recording and updating path traveled data by recording said current or from position and said to or destination position.

4. The method of claim 1, said stocker related records comprising:
- a stocker identification number;
- a maximum task number, being a maximum number of tasks that can be assigned to the stocker of said stocker identification number; and
- a current task number, being a current number of tasks that are assigned to the stocker of said stocker identification number.

5. The method of claim 1, said evaluating stocker resources comprising:
- sequentially accessing the stocker related records stored in a Stocker Resource Q file, each stocker related record in said Stocker Resource Q file being represented by a Stocker Resource Q record; and
- extracting from said Stocker Resource Q file a first Stocker Resource Q record indicating an available stocker, said first record comprising the available stocker's ASID.

6. The method of claim 1, said evaluating move priority comprising:
- accessing said task related records, therefrom accessing all task related records having a task scheduled against said ASID, creating a first file;
- selecting from said first file all records representative of tasks scheduled against said ASID being in a wait state, creating a second file, said second file comprising indicators of task priority and task wait time;
- sorting records of said second file in priority order, a highest priority being listed first after which lower priorities are sequentially listed in descending order and in accordance with a numeric value assigned to this priority, creating a third file;
- sorting said records of said third file in task wait time order, a longest task wait time being listed first after which lesser task wait time are sequentially listed in descending order and in accordance with a numeric value assigned to this task wait time, creating a fourth file, said fourth file comprising a first record of highest priority and longest wait time, said first record comprising a Selected Current Position ID;
- modifying a Wait status indicator to a Run status indicator; and
- directing said AMHS to issue a Move command for said Selected Current Position ID.

7. A method in an Automatic Material Handling System (AMHS) for assuring constant product movement and for controlling priority of movement of product, said product being contained in a unit referred to as a stocker, said method comprising:
- receiving and interpreting a timer signal;
- accessing and updating databases, said databases including a Task-Q file that stores task related records, each task related record represented by a Task-Q record, wherein a task is a movement of a product from a current position to a destination position, and a Stocker Resource Q file that stores stocker resource related records;
- checking, by a computer, the Stocker Resource Q file for an available stocker, wherein said checking comprises sequentially accessing the Stocker Resource Q file and extracting a first stocker resource related record indicating an available stocker, said available stocker being identified by an available stocker ID (ASID); and checking, by the computer, the move priority of the task related records in the Task-Q file, wherein said checking comprises:
  accessing said Task-Q file, therefrom accessing all Task-Q records having a task scheduled against said ASID, creating a first file;
  selecting from said first file all records representative of tasks scheduled against said ASID being in a wait state, creating a second file, said second file comprising indicators of task priority and task wait time;
  sorting records of said second file in priority order, a highest priority being listed first after which lower priorities are sequentially listed in descending order and in accordance with a numeric value assigned to this priority, creating a third file;
  sorting said records of said third file in task wait time order, a longest task wait time being listed first after which lesser task wait time are sequentially listed in descending order and in accordance with a numeric value assigned to this task wait time, creating a fourth file, said fourth file comprising a first record of highest priority and longest wait time, said first record comprising a Selected Current Position ID;
  modifying a Wait status indicator in said Task-Q file to a Run status indicator; and
  directing, by the computer, said AMHS to issue a Move command for said Selected Current Position ID.

8. A method for assuring constant product movement and for controlling priority of movement of product in an Automatic Material Handling System ("AMHS"), said product being contained in a unit referred to as a stocker, said method comprising:
  creating, maintaining, updating, and deleting of task related records, each task related record represented by a Task-Q record stored in a Task-Q file, whereby a task is a movement of a product lot from a current position to a destination position, wherein the creating, maintaining, updating, and deleting of the task related records comprises, on a per task basis:
    entering a task as represented by a Task-Q record into the Task-Q file, thereby including entering a current position and a destination position, concurrently entering a time indicator of said entry of said task into said Task-Q file;
    deleting the task as represented by a Task-Q record from the Task-Q file, concurrently entering a time indicator of said deleting of said task from said Task-Q file;
    calculating a first time expired between said entering of the task into said Task-Q file and deleting the task from said Task-Q file;
    recording and updating the task's run and wait status, concurrently entering a time indicator of initiation or termination of said task's run and wait status;
    recording a time indicator of task completion;
    calculating a second time expired between said task completion and said initiation of said run status, said second time expired being a transmission time;
    calculating a third time expired between said initiation of said run status and initiation of said wait status, said third time expired being a waiting time; and
    recording and updating path traveled data by recording said current or from position and said to or destination position;
  creating, maintaining, updating and deleting of stocker related records, each stocker related record represented by a Stocker Resource Q record stored in a Stocker Resource Q file, whereby a stocker is a basic unit for transportation of said product;
  evaluating, by a computer, stocker resources, thereby using the Stocker Resource Q file, identifying an Available Stocker ID (ASID);
  evaluating, by the computer, move priority, thereby accessing the Task-Q file using said ASID as a search argument, thereby selecting a Highest Move Priority record having a longest wait time; and
  issuing, by the computer, a move command to said AMHS for the Highest Move Priority record having the longest wait time.

9. The method of claim 8, said task related records in the Task-Q file comprising:
  lot identification number;
  current position identification number, being a stocker identification number;
  destination position identification number, being a stocker identification number;
  move priority, being a numerical indicator;
  move status, being a run and a wait status;
  transmission time, being a time expired between issuing of a move command and arrival at the destination position;
  waiting time, being a time expired between entering a wait status and entering a run status;
  path traveled, being a running record of current position identification number and destination position identification number, each of these running records being provided with a time stamp.

10. The method of claim 8, said stocker related records comprising:
  a stocker identification number;
  a maximum task number, being a maximum number of tasks that can be assigned to the stocker of said stocker identification number; and
  a current task number, being a current number of tasks that are assigned to the stocker of said stocker identification number.

11. The method of claim 8 further comprising periodically checking the task related records.

12. The method of claim 8, said evaluating stocker resources comprising:
  sequentially accessing said Stocker Resource Q;
  extracting from said Stocker Resource Q a first record indicating an available stocker, said first record comprising the available stocker's.

13. The method of claim 8, said evaluating move priority comprising:
  accessing said Task-Q file, therefrom accessing all Task-Q records having a task scheduled against said ASID, creating a first file;
  selecting from said first file all records representative of tasks scheduled against said ASID being in a wait state, creating a second file, said second file comprising indicators of task priority and task wait time;
  sorting records of said second file in priority order, a highest priority being listed first after which lower priorities are sequentially listed in descending order and in accordance with a numeric value assigned to this priority, creating a third file;
  sorting said records of said third file in task wait time order, a longest task wait time being listed first after which lesser task wait time are sequentially listed in descending order and in accordance with a numeric value assigned to this task wait time, creating a fourth file, said fourth file comprising a first record of highest priority and longest wait time, said first record comprising a Selected Current Position ID;

modifying a Wait status indicator in said Task-Q file to a Run status indicator; and issuing a Move command for said Selected Current Position ID.

* * * * *